US012737476B2

(12) United States Patent
Blume et al.

(10) Patent No.: US 12,737,476 B2
(45) Date of Patent: Sep. 15, 2026

(54) COMPILE-TIME NATIVE CODE SOFTWARE BILL OF MATERIAL GENERATOR

(71) Applicant: Runsafe Security, Inc., McLean, VA (US)

(72) Inventors: Salim Rolf Blume, Weare, NH (US); Kelli Schwalm, Owens Cross Road, AL (US); Shane Paulsen Fry, Madison, AL (US)

(73) Assignee: RUNSAFE SECURITY, INC., Mclean, VA (US)

( * ) Notice: Subject to any disclaimer, the term of this patent is extended or adjusted under 35 U.S.C. 154(b) by 282 days.

(21) Appl. No.: 18/609,339

(22) Filed: Mar. 19, 2024

(65) Prior Publication Data

US 2024/0320342 A1 Sep. 26, 2024

Related U.S. Application Data

(60) Provisional application No. 63/453,222, filed on Mar. 20, 2023.

(51) Int. Cl.
*G06F 21/57* (2013.01)
*G06F 8/77* (2018.01)

(52) U.S. Cl.
CPC .............. *G06F 21/577* (2013.01); *G06F 8/77* (2013.01); *G06F 2221/033* (2013.01)

(58) Field of Classification Search
CPC ..... G06F 8/77; G06F 21/577; G06F 2221/033
USPC ......................... 717/101–103, 152, 162–167
See application file for complete search history.

(56) References Cited

U.S. PATENT DOCUMENTS

| | | | | |
|---|---|---|---|---|
| 6,088,693 | A * | 7/2000 | Van Huben | G06F 16/2343 |
| 11,349,670 | B1 | 5/2022 | Miller | |
| 11,625,553 | B2 * | 4/2023 | Powles | G06V 30/413 382/155 |
| 12,333,019 | B2 * | 6/2025 | Duggan | G06F 21/6227 |
| 2017/0169229 | A1 | 6/2017 | Brucker et al. | |
| 2021/0382997 | A1 | 12/2021 | Yi et al. | |
| 2024/0031394 | A1 * | 1/2024 | Parla | G06F 21/51 |

OTHER PUBLICATIONS

Shripad Nadgowda, "Engram: The One Security Platform for modern Software Supply Chain Risks", 2022, ACM, pp. 7-12. (Year: 2022).*

Paketo Buildpacks, "Create a Paketo Buildpack" , 2022, retrieved from /https://paketo.io/docs/howto/create-paketo-buildpack/ , 12 pages. (Year: 2022).*

International Search Report and Written Opinion for International Application No. PCT/US2024/020521; Date of Mailing: Jul. 2, 2024; 10 pages.

* cited by examiner

*Primary Examiner* — Ted T. Vo

(74) *Attorney, Agent, or Firm* — Ashurst Perkins Coie US LLP

(57) ABSTRACT

Presented is a method for capturing the software bill of material (SBOM) for compiled-code languages (like C or C++), in the absence of a package manager (such as Conan). The method loads a library into the process space of all tools used in the build process (e.g. gcc, Id, as, etc), which allows it to observe all of the files opened by the build tool during the build process. By combining a process identification tree, PID tree, with the record of which files were opened or created by which build tools, the system is able to identify all of the files utilized in the build and create a tree of which files depend on which other files.

20 Claims, 9 Drawing Sheets

COMPILE-TIME NATIVE CODE SOFTWARE BILL OF MATERIAL GENERATOR

TECHNICAL FIELD

This disclosure revolves around the critical intersection of software development, cybersecurity, and software composition analysis. This domain focuses on mitigating security risks inherent in application development where the end work product are proprietary software products dependent and built upon a menagerie of inputs including open-source code and elements related to the developer's environment. A pivotal challenge arises from potential vulnerabilities within open-source components which, if not meticulously tracked, can propagate unnoticed through the developer's software, leading to significant security breaches.

BACKGROUND

In today's digital age, the integrity and security of software systems are paramount. Amidst escalating cybersecurity threats, the concept of a "Software Bill of Materials" (SBOM) has emerged as an indispensable tool for enhancing software security and managing supply chain risks. An SBOM serves as a detailed inventory, encapsulating the diverse components that constitute software applications. This comprehensive listing is critical, given the multifaceted origins of software components in contemporary programs, where analysis by the Linux Foundation reveals that 70%-90% of modern software is derived from open-source contributions. Open-source software, despite its vital role in propelling software development forward, has unfortunately introduced new vulnerability classes that pose significant cybersecurity threats.

The complexity of the software supply chain, involving an intricate web of suppliers, Original Equipment Manufacturers (OEMs), and developers, renders the task of enumerating the complete software composition within an enterprise a daunting challenge. The significance of this challenge was starkly highlighted in 2021 when a supply chain attack successfully compromised several US government organizations, primarily due to a lack of visibility into the vulnerabilities introduced by third-party code.

The National Vulnerability Database (NVD) reported more than 20,000 new vulnerabilities in 2021 and over 25,000 in 2022, many of which were found in the open-source code utilized by developers. High-profile vulnerabilities, such as the critical flaw discovered in OpenSSL in 2022, underscore the urgent need for organizations to have precise knowledge of the software integrated into their systems. This visibility is essential for identifying and mitigating cyber risks effectively.

Recognizing the importance of SBOMs, the Biden administration issued an executive order in May 2021 mandating federal contractors and certain federal programs to generate SBOMs for systems provided to the government. This initiative aims to foster greater transparency and enable more accurate risk assessments based on a detailed understanding of the software operational within enterprises.

While generating SBOMs for modern programming languages like JavaScript is relatively straightforward, thanks to the inclusion of dependency libraries in configuration files, the process is considerably more complex for older languages such as C and C++. The challenges are diverse, ranging from build systems that retrieve source files from restricted servers, to variations in software versions pulled during the build process, and the intricacies of compiling a final binary or library. These obstacles highlight the necessity for SBOM tools that can effectively analyze the build process in real-time to ensure a comprehensive and accurate listing of all software components.

The reliance on static analysis of compiled binaries for creating SBOMs is fraught with limitations. Static libraries integrated into binaries and various files provided by the compiler are often omitted from the final SBOM. Furthermore, optimizations by compilers and linkers can significantly alter the final program code, rendering traditional hash-based identification methods ineffective.

Disclosed herein is a method for producing an all-inclusive SBOM capturing details extending to the furthest branches of the file tree and triggered by events within the operating system. This method signifies a pivotal development in the realm of software security and supply chain risk management. By providing a detailed inventory of software components, SBOMs empower organizations to swiftly identify and address vulnerabilities, make informed decisions regarding cybersecurity measures, and ultimately safeguard their digital assets against exploitation. As the digital landscape continues to evolve, the role of SBOMs in ensuring the security and integrity of software systems will undoubtedly become increasingly vital.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure but are intended to be illustrative only.

DETAILED DESCRIPTION

In typical C/C++ programming projects, a mere 5-10% of the resulting machine language code in the final compiled product is originally authored by the developer. The lion's share of the object code is attributed to open-source components, such as libraries like glibc and libm. These libraries provide essential functionalities, including mathematical operations, encrypted communication, and network protocol management, thereby sparing the developer from the need to code these functions from scratch.

However, the integration of such open-source code into proprietary software introduces significant security challenges. Should these open-source components harbor vulnerabilities, and developers fail to meticulously track the specifics of the open-source code utilized within their projects, identifying the extent of vulnerabilities propagated by their software becomes an insurmountable task.

This scenario underscores the innovation behind a novel tool designed disclosed herein to automate the creation of a Software Bill of Materials (SBOM) for compiled programming languages.

Although the examples and embodiments presented herein are illustrated utilizing C and C++ programming on a Linux operating system, it's important to note that the utility of this tool is not confined to these parameters. It is applicable across a broad spectrum of compiled languages and modern operating systems, including, but not limited to, Windows and VxWorks. This invention represents a significant leap forward in addressing the complexities associated with tracking and managing the open-source components embedded in software projects, thereby enhancing overall software security.

Furthermore, it should be understood that the term binary file, as presented herein, encompasses executable code, object code, library files, in their binary form as machine code. The term data file refers to a file used to store information such as collection of records organized as a database which generally do not translate into an executable series of machine code instructions. The term batch file or make file refer to a file containing a series of instructions to facilitate the build operation which provide at least one command to the operating system for the purpose of interacting with files, setting environmental variable, or passing command-line arguments.

Figure 1:
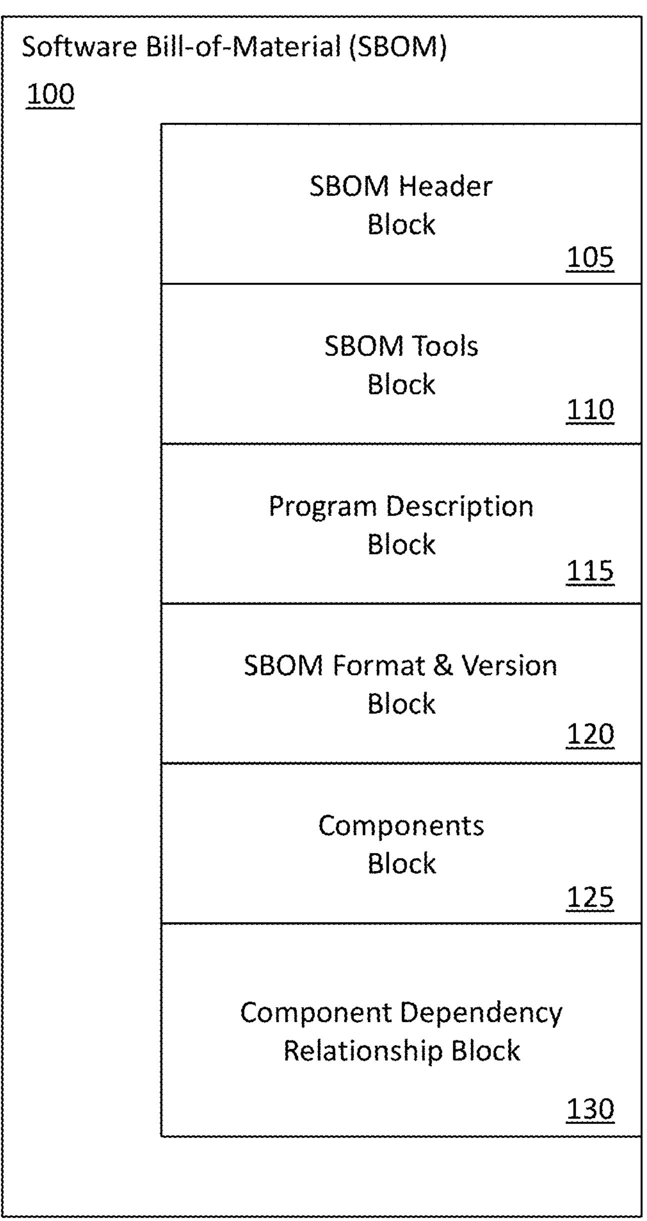
FIG. 1 shows a block diagram of a software bill-of-material.

FIG. 1 shows a block diagram of a software bill-of-material, software BOM, or SBOM. In a preferred embodiment the software BOM may be structured as readable text such as JavaScript Object Notation (JSON) format but may exist in any number of other formats and standards such as a text file, comma separated variable, delimited, or machine readable format such as a binary. Shown as a simplified block diagram, FIG. 1 serves to indicate the key components of the SBOM relevant to the invention. The order in which the blocks appear may be interchangeable and do not limit the scope of the invention.

The first block shown within the SBOM 100 is the SBOM Header 105. This block serves as the header for the SBOM file. It can provide information to the reader as to how the following blocks may be organized or in some cases reference a scheme which is known in the industry.

The second block, SBOM Tools 110, outlines the tools used to create the SBOM and may include information such as the tool name, tool vendor, and version of the tool.

The program description block 115 contains the name and properties of the program covered by the SBOM. Properties may include the file type such as application or library, version control associated with the program.

The SBOM Format and version block 120 contains detailed information on the SBOM format. There are several known standards and formats for SBOMs that have been widely discussed and adopted in various degrees within the industry, including: CycloneDx, SPDX (Software Package Data Exchange), and SWID (Software Identification Tags). CycloneDX is an SBOM standard designed for use in application security contexts and is the preferred embodiment and basis for the layout of FIG. 1.

The components block 125 includes a list of components required for the application identified in the program description block to either function in the case of interpreted language, or to properly build in the case of languages which are compiled and linked.

One important insight provided by the SBOM is the dependency relationship between the components identified in the component block 125. This information is held in the component dependency relationship block 130.

As an example, a software BOM for an common executable application named Hello_world which utilizes and has a dependent relationship with a header file for the standard library (e.g. stdio.h) would have the following information. The SBOM header 105 would describe the general schema used for the SBOM. The SBOM tools 110 would describe the program used to create the SBOM, such as the SBOM tool named CycloneDX-NPM by the vendor CycloneDX, and with version 1.2.0. The Program description 115 would contain the program name "Hello_world", identify that it is an application, the version number, and the BOM-REF tag which would refer to the component required during the build (i.e. stdio.h). It should be noted that the program itself is considered a component. Details of the required component (stdio.h) such as the filename, version, and file type would be found in the component block 125 along with a BOM-REF identifier. Finally, the relationship between the components comprising the program and the library is described in the component dependency relationship block 130 and in this example, it would be stated that Hello_world depends on stdio.h.

Figure 2:
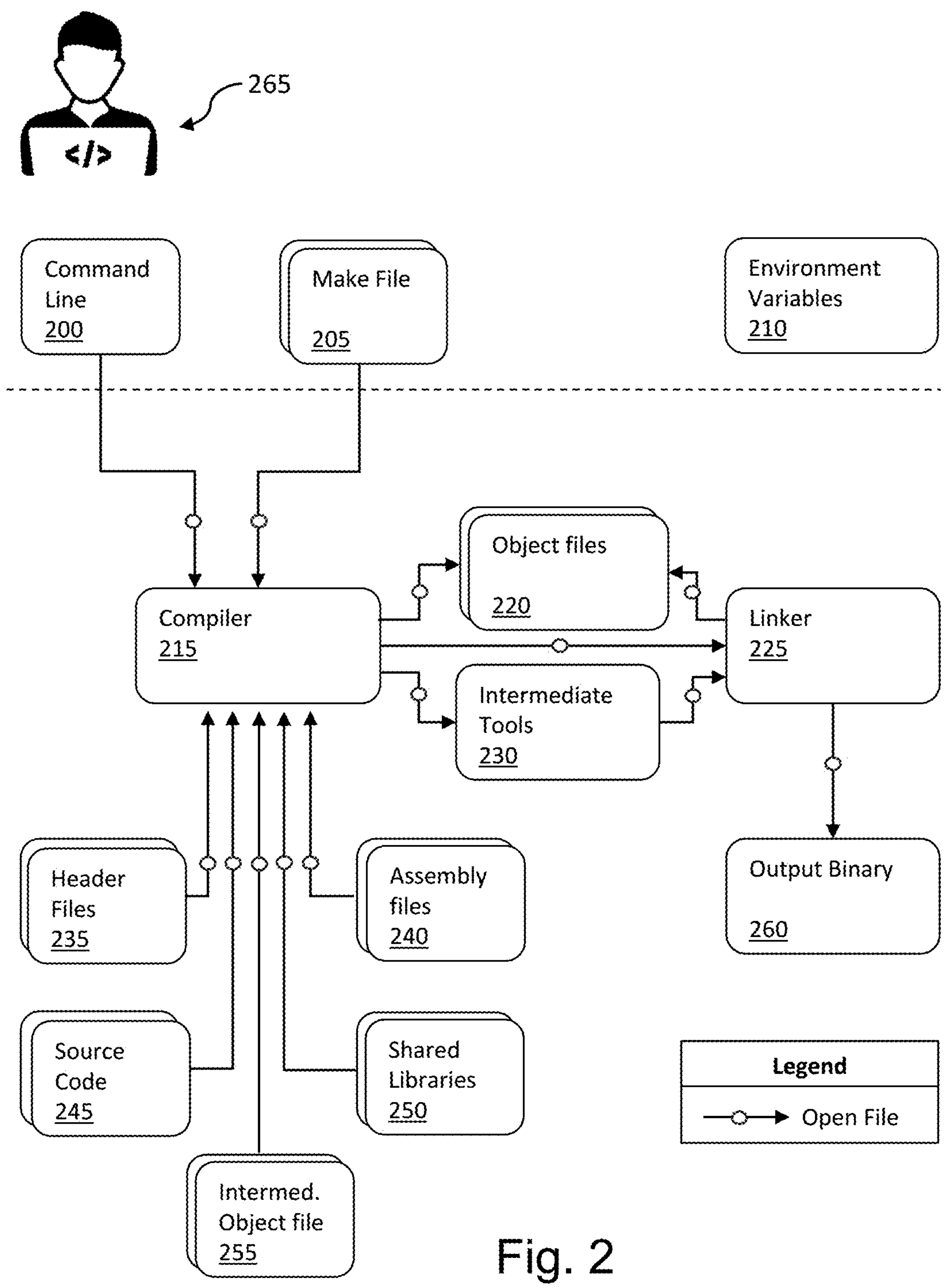
FIG. 2 shows the inputs and outputs of the C and C++ software build process on a developer's system.

FIG. 2 shows the inputs and outputs of the C and C++ software build process on a developer's system 265. The developer's system includes global or local environment variables 210 which may be predefined and have relevance during the build session. One environmental variable which will be used by the preferred embodiment of the inventive concept will be the LD_PRELOAD.

The LD_PRELOAD environment variable in Unix-like operating systems (such as Linux) is used to specify one or more shared libraries that should be loaded before any other libraries, including the standard C library (libc.so). This feature allows users to override system library functions with their own versions or to add additional functionality to existing binaries without having to modify their source code. A similar approach to override a function exists in Windows and is referred to as DLL injection. Use of this LD_PRELOAD feature to support the inventive concept will be presented at a later point in the specification.

The build process for the C/C++ shown in FIG. 2 illustrates the steps of both compiling via a compiler 215 and subsequently linking the output of the compiler via a linker 225 in order to produce an output binary 260. As the software build process is well understood, the intricacies of the steps are simplified here. The developer instructs the operating system to open the compiler and passes arguments to the compiler such as the filename. The compiler in response may open the targeted source code 245, header files 235, assembly files 240, and shared libraries 250 in order to produce an object file(s) 220. In addition, the compiler may open additional applications such as a preprocesser for macros and conditional logic, assembler for handling assembly files, or prelinker to handle intermediate object files 255. The compiler then opens the linker 225 and specifies the object file 220 to be opened by the linker 225 to produce the output binary 260.

It should be noted that each arrow shown in FIG. 2 represents an operating system or OS instruction to open a file. Herein, this disclosure will refer to the native operating system open( ) function as OS_Open( ). The OS_Open( ) function will be used as an event trigger to support the inventive method. This nomenclature will provide clear distinctions between native operating system capability and open functions of the SBOM Capture System presented at a later point in the specification.

At the beginning of the build process the operating system responds via an OS_Open( ) to open the compiler. As stated previously, the compiler will then invoke an OS_Open( ) to access the contents of the required input files (namely the header files, source code, assembly files, and/or shared libraries). It is common for the input files to reference additional input files which the compiler will concurrently OS_Open( ) while diving deeper into the branches of the software—with one source file depending upon another (i.e. creating a dependency). Once the compiler has read the required input files, the compiler performs another OS_Open( ) to create an output object file 220 to export the non-executable machine code, and a subsequent OS_Open( ) to initiate the linker. Finally, the linker invokes an Open_OS( ) to create the output binary file 260.

Returning to FIG. 2 with a further degree of detail, the software build process may be initiated from any number of build tools, including via a command line 200 or via a make-file 205. The command line option is initiated by the developer commonly entering the name of the compiler and passing argument including the filename such as "gcc hello.c". An alternative method to invoke a build would be via a make file (205), which is a text file of build instructions and variables. As an example of starting a build with a make file would include the developer entering "make hello" into a command prompt.

Make files 205 typically contain commands that include setting environment variables, copying files, deleting files, and invoking the compiler (210). In addition, a make file may call other make files, thereby nesting make files. In the case of nested make files, the first make file will ask the operating system to open (i.e. OS_Open( )) the subordinate make file. As with OS_Open( ) requests for the compiler, the OS will locate the nested make file in the file system and create the required data structures in memory, so that the nested make file can begin to execute.

In some cases a make file may bypass the compiler and directly command the linker (220) to process existing object files. This can be done for a variety of reasons, including a more complex build where some extra processing is required before the compiler calls the linker. When the make file runs the linker, it makes an OS_Open( ) (203) request to open the linker (220).

The compiler 215 may utilize several tools, as it oversees the build process. One class of tools will be intermediate tools (230), which do specific actions that assist the compiler. A non-exhaustive list of intermediate tools include the C preprocessor, the assembler, and archive tools. These intermediate tools may also draw upon the input files (collectively 234, 240, 245, and 250) via OS_Open( ) calls. The output of these intermediate tools may be directed back to the compiler or to the Linker (220). The output of the compiler could be in the form of a single object file 220 or multiple object files. Each new output file depends on the inputs passed to the intermediate tools, and the SBOM capture library will track those dependencies in the generated SBOM.

Figure 3A:
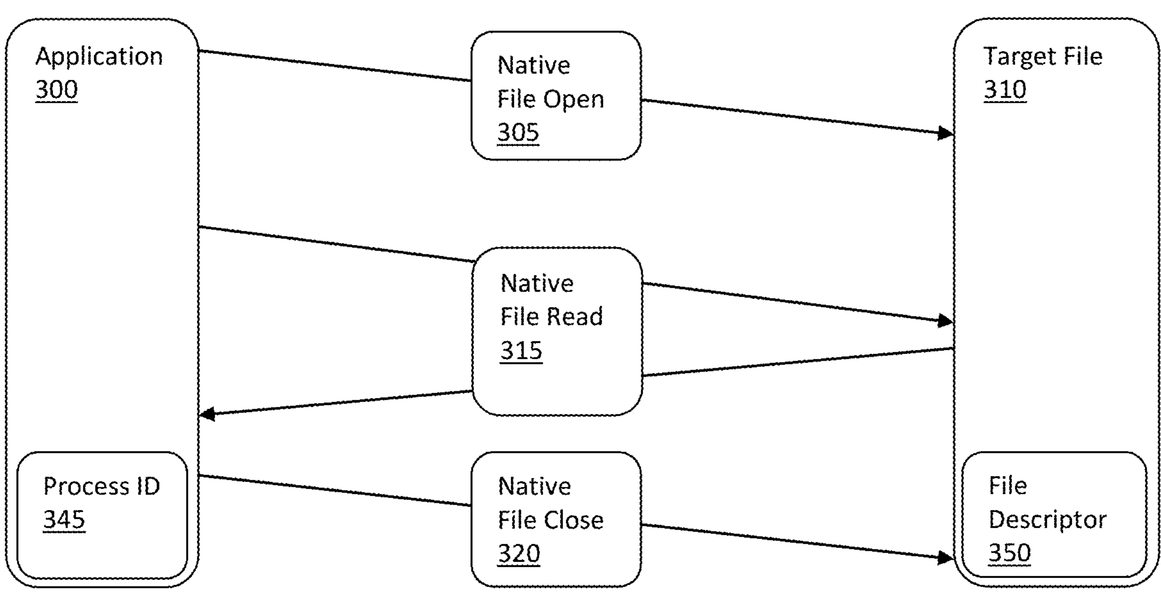
FIGS. 3A and 3B illustrate the concept of overloading a function.
Figure 3B:
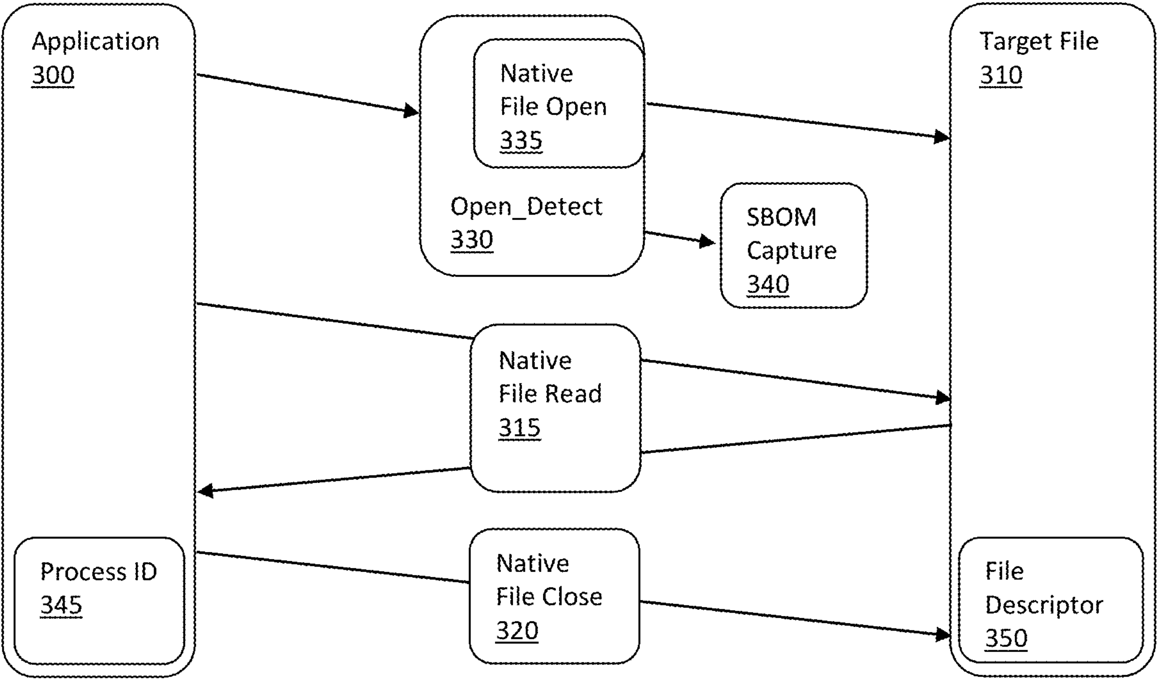

FIGS. 3A and 3B illustrate the concept of overloading a function as it pertains to and is utilized by the inventive concept. The scenario shown in FIG. 3A is an application 300 trying to read the contents of a target file 310. To accomplish this, the application commands the operating system to open the file utilizing the native operating system file open 305 (as previously defined as OS_Open( ). The operating complies and opens the target file for access. Once opened by the operating system, the contents may be read via a native file read 315 initiated by the application, and subsequently closed via a native file close command 320.

FIG. 3B shows the native file open 335 function encapsulated within a function called Open_Detect( ) 330. The desired effect as it pertains to the inventive concept is to trigger the SBOM capture function 340. This is accomplished by a practice known as wrapping or interception of the native file open command. Wrapping the native file open command 305 involves creating the wrapper function, Open_Detect( ) 330, that internally calls the native file open system call 335, while adding the additional functionality necessary to trigger the SBOM capture function 340.

Within the operating system, the application is initially registered with the operating system by a process ID (PID) 345 which is unique to the application 300. When the application opens the target file 310, the operating system assigns a file descriptor 350 to that file for the duration of the time it is open by the application. The file descriptor is a reference that the application uses to read from, write to, or otherwise manipulate the target file. Each target file that is opened by the application is associated with its own unique file descriptor or handle within the application's context.

In the inventive concept the application may be the compiler or the linker and the target files may be the source files, assembler files, object file, header files, shared libraries, or nested make files. Tracking the file descriptor on each file opened by the application enables a mapping of the dependencies.

Figure 4:
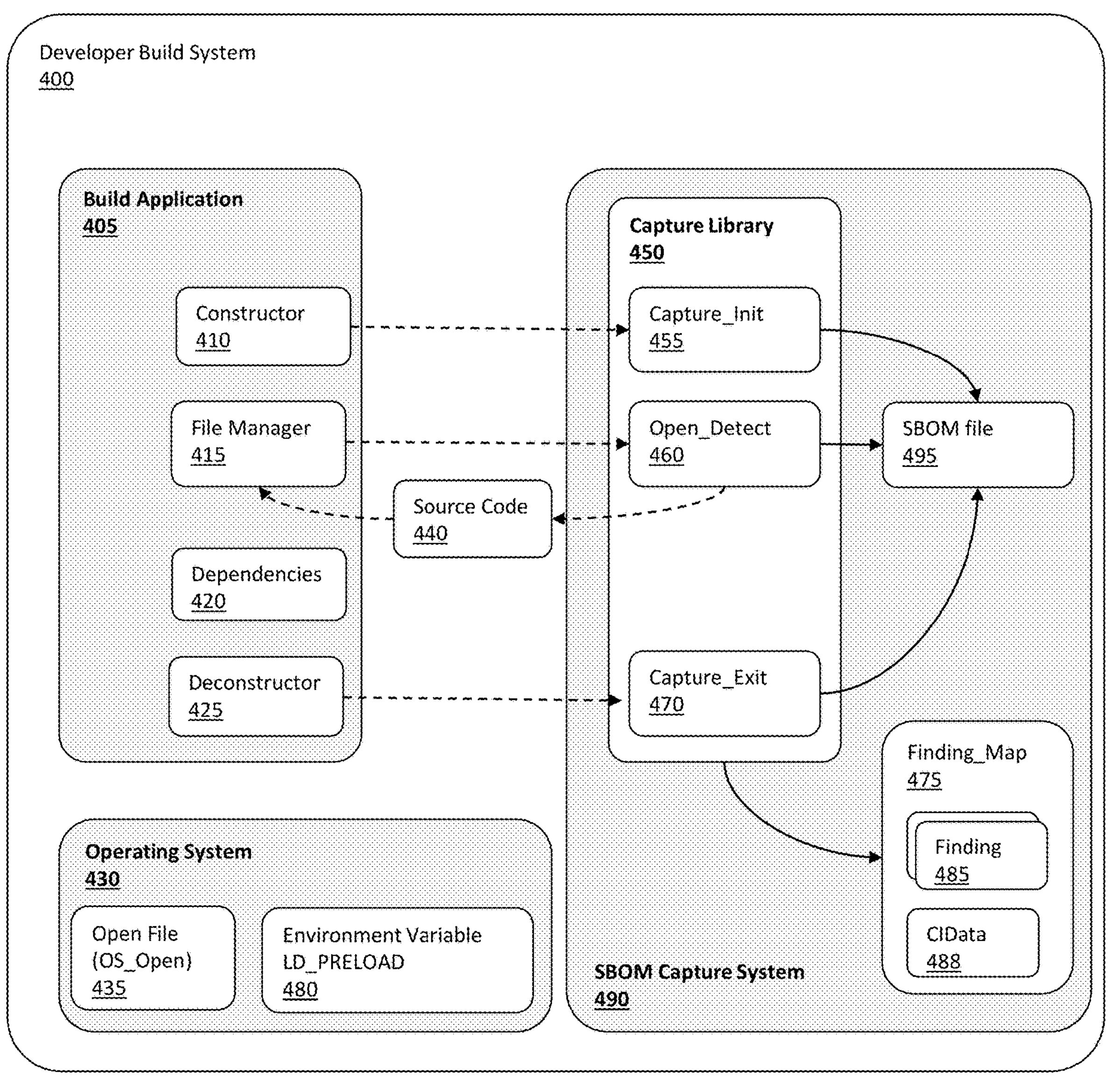
FIG. 4 is a system drawing showing the SBOM Capture System.

FIG. 4 is a system drawing showing an embodiment of the present invention, the SBOM Capture System 490 for compiled languages (e.g. C, C++, and Assembly) either residing on or accessible by a developer's build system 400. It is understood that components shown may exist may be networked and exist outside of the physical boundaries of a workstation.

A custom library, shown in FIG. 4 as the Capture Library 450, interfaces with elements that are standard to the developer's build system. The standard elements include the operating system 430 and the build application 405.

The operating system open file 435 (a.k.a. OS_Open( ) shown in FIG. 4 is the standard open file function used by the operating system each time a file is created, read, or written. Also shown in the operating system is the environment variable LD_PRELOAD 480. LD_PRELOAD is an environment variable in Unix-like operating systems that specifies additional, user-specified, shared libraries to be loaded before any other libraries thereby enabling the overriding of functions from other shared libraries.

The build application 405 can be the compiler, linker, or assembler chosen by the developer to accomplish the task of creating binary files. While the present invention has been developed for the purpose of SBOM generation, it will be understood that the concepts presented may be applied to any application which opens files within the course of carrying out the task of the application.

Two events are registered after an application is loaded into memory and prior to execution of the application's core function—these events are a constructor 410 event and a deconstructor 425 event. The constructor carries out the tasks necessary for the program to operate such as allocating memory, loading libraries required by the application, and registering the functions existing in those libraries. The deconstructor carries out the tasks which occur when the application closes and commonly includes tasks such releasing memory. In addition, functions or blocks of code may be assigned to both the constructor and deconstructor to be invoked during the event.

A build application will ultimately contain the concept of a file manager 415 whose purpose is to open and read files relevant to the build process. For the simplification of this example, the source code 440 represents any files which may be created or accessed during the build process. Also, the build process in its entirety may include a single build application, such as the case where source code is compiled into non-executable object code, or multiple build applications, such as the case where a compiler subsequently launches the linker.

In many cases the build application 405 will open and read source code 440 which contains instructions to reference and read another source code file, such as hello_world.cpp requiring the header file hello_world.h—which may in turn require and reference stdio.lib. The build application has unique knowledge within its process to track and manage the files and the relationship, shown in FIG. 4 as the dependencies 420.

Unique to the developer's build system in FIG. 4 and at the core of the inventive concept is the Capture Library 450. The Capture Library comprises three functions shown as Capture_Init( ) 455, Open_Detect( ) 460, and Capture_Exit( ) 470. Detailed accounts of these functions appear later in the specification, however, a synopsis of how they exist, and their purpose follows. In an alternative embodiment the library could be added to the kernel, built into the build application, or invoked by other means such as being loaded into the build application process space by the build tools.

In one embodiment of the inventive concept, LD_PRELOAD is assigned to load the Capture Library within the user space which will cause the operating system to load the Capture Library and invoke initialization functions within the library during the application construct. Capture_Init( ) 455 is an initialization function that is registered and invoked during the build process construct event. Capture_Init( ) is responsible for setting up the details of SBOM capture capability inside of a target compilation process and creates the SBOM file 495. As part of the setup, Capture_Init( ) registers the Capture_Exit( ) 470 to be invoked during the deconstruct and creates the wrapping of the operating systems OS_Open( ) 435 within the Open_Detect( ) function 460. The link between the build application constructor 410 and Capture_Init( ) is shown by a dotted line.

Open_Detect( ) 460 acts as a wrapper around the OS_Open( ) calls. Any request by any the build application to open a file, will be forced to call Open_Detect( ) rather than accessing the operating system's OS_Open( ). The intercepted request to Open_Detect( ) will in turn respond by passing the source file to the build applications file manager 415—this relationship is shown by a closed loop dotted line between these elements. The wrapper gives the SBOM capture system perfect insight into all files used at any point in the build process and writes this information into the SBOM file 495.

Capture_Exit( ) 470 manages the completion of the SBOM Capture System's activity and is registered to be invoked during the deconstruct event of a build application. This will include writing final details and closing the SBOM file 495. The link between the deconstructor 425 and Capture_Exit( ) is shown by a dotted line.

Finding_Map 475 represents a database managed by the Capture Library which holds the combined findings populated during the life of the build application. As each build application is assigned a unique process ID for which the SBOM generator system 490 is collecting file open information, every file accessed via an Open call will have an entry in the Finding_Map and each unique file identified is known as a finding 485. In the preferred embodiment, Finding_Map is a dictionary data structure where the key is the path and filename of the file. The value assigned to the key may include the following data, among other possible data fields: File_type, Author, Publisher, Name, Version, Hash, Licenses, Copyright, Pid-Process ID.

In some embodiment, the CIData 488 or Continuous Integration Data pertaining to the specific build job run by the build process may be collected. Integrating an SBOM Capture System with Continuous Integration (CI) systems involves a set of mechanisms designed to ensure seamless operation within the software development lifecycle while maintaining high standards of data security. Typically, this integration is facilitated through CI system hooks or plugins that trigger the SBOM Capture System at specific points in the build process, such as DURING compilation or pre-deployment. These hooks can be configured to pass essential build metadata (e.g., job IDs, pipeline IDs, commit tags, run_id, run_attempt, runsafe_audit_id) to the SBOM Capture System, which then incorporates this data into the SBOM entries, linking build artifacts with their respective source code origins and build parameters.

As previously presented various operating systems offer techniques analogous to Unix/Linux's LD_PRELOAD mechanism, allowing developers to intercept and override library functions. On Windows, a comparable technique is known as "DLL Injection." This method involves injecting a custom Dynamic Link Library (DLL) into the address space of another process, enabling the injected DLL to run within the context of the target application. This can be used to modify the behavior of existing functions or add new functionality to the application without altering its source code. DLL Injection can be achieved through several methods, including the use of Windows API functions such as SetWindowsHookEx, which sets a hook to monitor certain types of events, or CreateRemoteThread, which creates a thread in another process's address space.

On macOS, a similar capability is provided through the DYLD_INSERT_LIBRARIES environment variable, which allows for the dynamic insertion of libraries into an application's link process before it runs. Like LD_PRELOAD, this technique can be used to override existing library functions or add new ones by specifying a list of additional libraries to load. This feature is particularly useful for debugging, testing, or enhancing the functionalities of existing binaries without needing to recompile them.

Figure 5:
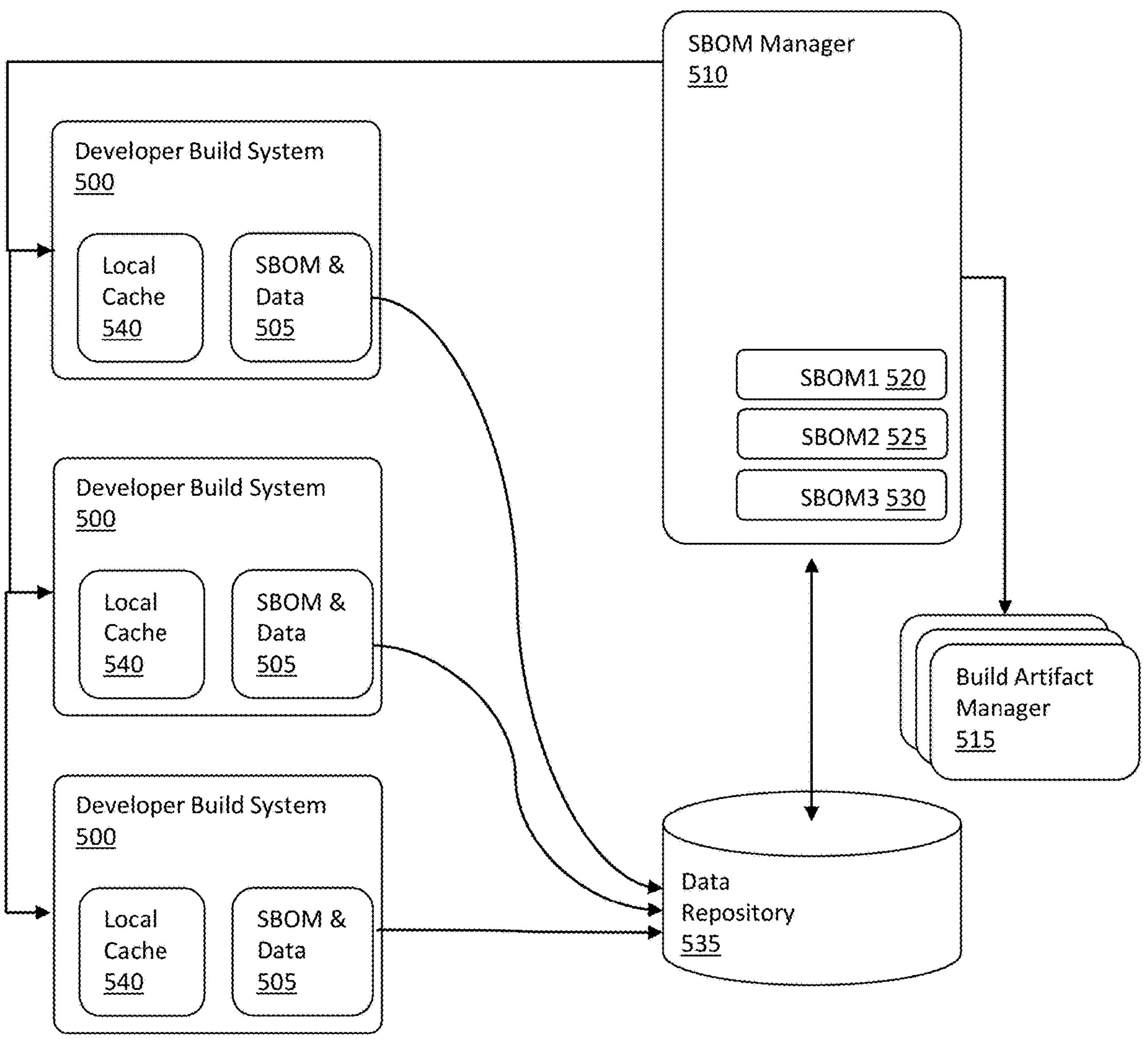
FIG. 5 shows the architecture of a centralized SBOM Manager.

FIG. 5 shows the architecture of a centralized SBOM Manager 510 to function as a shared database between multiple developer build systems 500. In one embodiment, multiple developers within an organization working on independent developer build systems 500 generating SBOMS and data 505 relating to the build process. In another embodiment, a data repository 535 is used to provide concurrency between multiple build processes occurring on the same developer system at the same time. In either embodiment, the developer build system sends the SBOM and raw data to a data repository 535.

The data repository 535 captures the SBOM and Data 505 across multiple builds. The data repository might be located on the developer's premises, or it might be located in a cloud-based service. The data repository is able to capture data from multiple developer build systems 500, each of which might be in different locations.

In turn, the SBOM Manager 510 processes the SBOM and data stored in the data repository, organizes the SBOM and data into a formatted SBOM file such as CycloneDX format, SPDX format, SWID format, proprietary format or other industry standard. In the preferred embodiment, the SBOM Manager further acts as a librarian of multiple SBOMs as shown as SBOM1 520, SBOM2 525, and SBOM3 530. The SBOM Manager 510 may store the SBOMs for future download or it can transmit the SBOM to other systems that the developer prefers. As an example, the SBOM manager may be connected to the developer's or organization's cloud based build artifact manager 515 (e.g. GitLab).

Also presented in FIG. 5 is the concept of a local cache 540 which is a database managed within the developer's build system. The local cache shown provides a method for increased efficiencies for managing hash verification or identification associated with known previously compiled files. In the context of software compilation, a hash refers to a fixed-size string or number generated from a piece of data, such as source code files. The primary purpose of using a hash in this scenario is to efficiently determine whether the content has changed. Before compiling, a build system may compute the hash of a file's contents and compare it to a previously stored hash. If the hashes match, it indicates that the file has not changed since the last compilation, potentially allowing the build system to skip recompiling that file, thereby saving time. This technique is often used in incremental compilation processes to minimize build times by only compiling changed files and their dependencies—and give the developer confidence that file content hasn't changed, even if the filename and path are the same. This gives developers 100% confidence that the files coming into their build are what is expected, while also providing rapid insights into the areas where files might have changed unexpectedly.

For each file opened during any of the build processes, a hash of that file is stored in the local cache 540 database. Before a file is hashed, the database is checked to see what the specific file already exists in the local caching database. If it doesn't exist, the file is hashed and that hash is stored in the database. The filename and path are used as the key, with the hash value being the value associated with the key. This facilitates easy lookups, by filename and path. In the preferred embodiment only one instance of the local caching database 540 exists on a developer's build system 500 and is deleted once the last build on the developers build system is complete.

The local cache 540 may also store other information about the file when it is available, such as its version, copyright, license, and author.

Figure 6A:
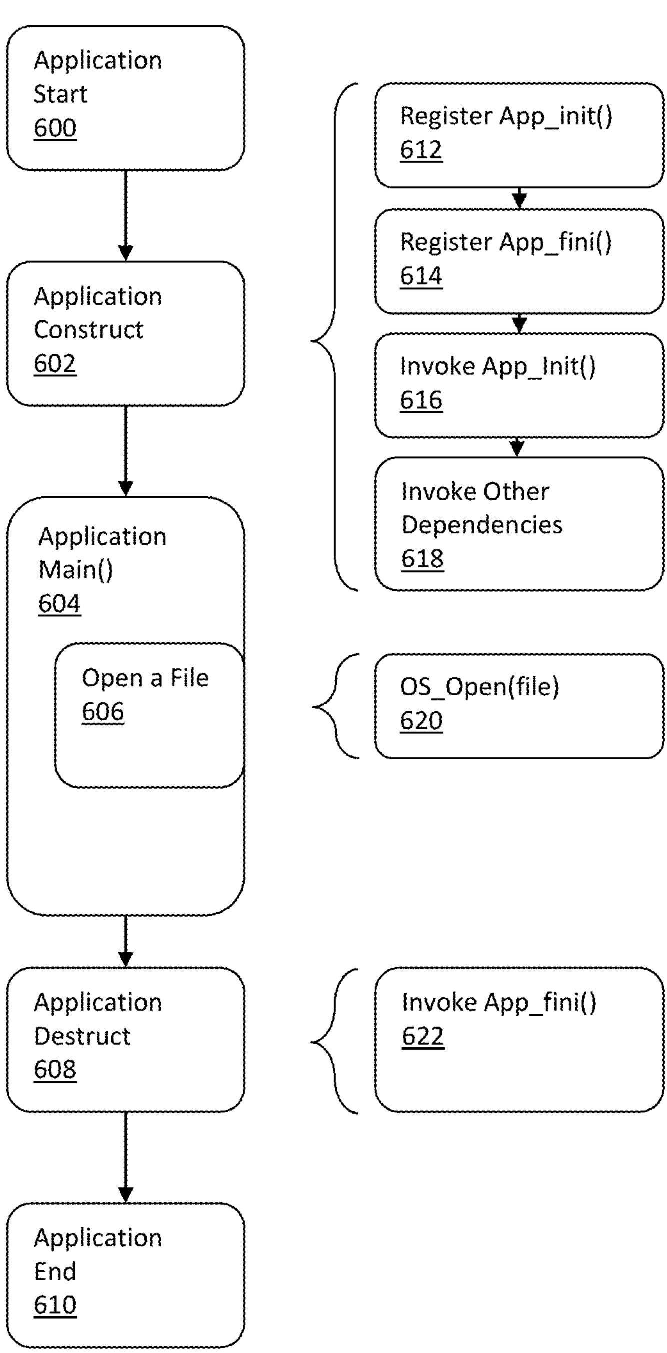
FIGS. 6A and 6B show the steps of a build process utilizing the SBOM generation system.
Figure 6B:
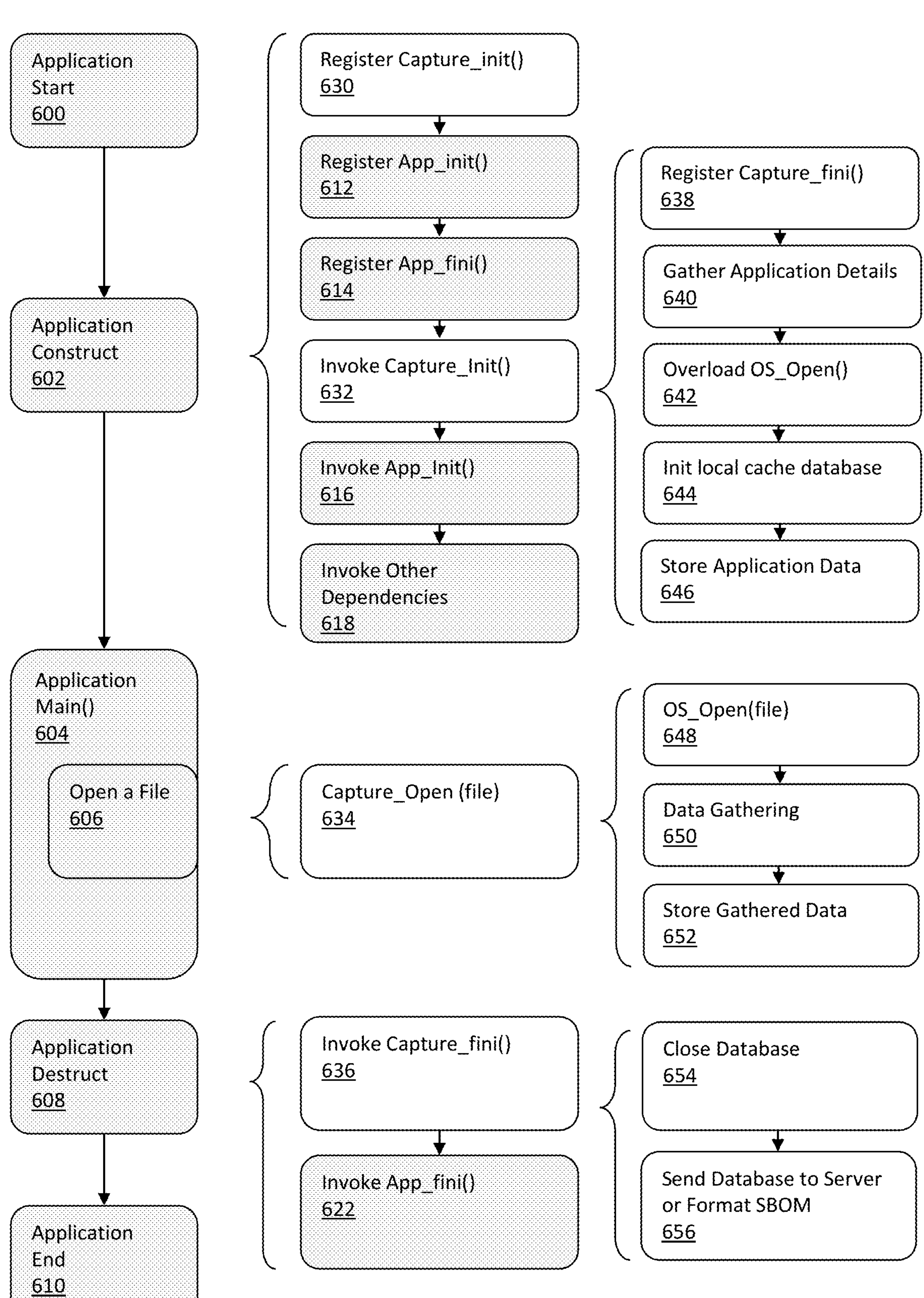

FIGS. 6A and 6B show the steps of a build process utilizing the SBOM generation system. FIG. 6A shows the steps which occur when the Capture library is not loaded by LD_PRELOAD or an alternative method. FIG. 6B shows the steps which occur when the Capture Library is loaded by LD_PRELOAD or an alternative method. Each step described in FIG. 6A appears in FIG. 6B and descriptions for the events appearing in 6A are thereby relevant and extended to the description of FIG. 6B. The build process may encompass a variety of stand-alone executable processes (compiler, assembler, linker, build tool) or multiple executable processes, here the term Application is used to represent any process or executable binary file executing on a developers build system.

The execution of an application comprises several events which occur in a sequential manor described herein. Thes figures outline the process setup steps for a Linux-based system. The pre-execution setup processes of all modern operating systems, like Windows, OS X, VxWorks, and others are architecturally similar. Implementation on other operating systems would be an obvious extension of this invention.

With regards to the steps shown in FIG. 6A, the application start 600 represents the point where a user, other executable, or make file has commanded the operating system to load the application or process into memory for execution. After the file is loaded, the operating system beings to execute the application's initialization start code or Application Construct 602, which precedes the application's main( ) function or application's objective.

In the Application Construct, basic memory organization takes place such as register initialization and stack initialization. As the LD_PRELOAD was not set to load the Capture Library, the application performs the following steps as part of the Application Construct. First the application registers the initialization function of the standard C library (e.g. glibc_init—the actual name of the c library initialization function can vary and doesn't change the concept) in the Register App_Init 612 block. Registration means that the application knows the location of the function within the library and has the ability to access the function. Next the application exit or App_fini function which will be invoked when the application is closing during the deconstruct is register in block 614.

After the App_Init( ) and App_fini( ) functions are registerd as part of the standard process lifecycle manged by the operating system, the App_Init( ) is invoked in block 616. App_init handles other aspects of process initialization including the setup of variables containing the command arguments and environmental variables. Finally, as the last step in the Application Construct 602, any constructors or destructors for other dependencies (such as shared libraries) are also registered and the constructors are executed in block 618. Once the various initialization routines are complete, execution continues to the application's main ( ) function and the program is said to be running.

Block 604, Application Objective, represents the main( ) function and generally corresponds with the application's primary purpose. In the scope of this disclosure, this implies performing the build process, but alternatively could also be applied to word processing or database management applications. Regardless of the application, at some point during the execution of many applications, there is a need to open a file. This file could be needed to read in a configuration, write a log, pull in images, store network data, or any one of a million other things. Block 604 represents the application commanding the operating system to open a file, giving the application the ability to manipulate the file. This request is received by the operating system as an OS_Open( ) file) (620) command and as part of the native operating system functionality, the file descriptor is passed to the application.

Once the application has completed its objective and is ready to terminate, the execution moves from Application Main( ) 604 to Application Destruct 608. As the App_fini( ) function was registered in block 614, the App_fini( ) function is invoked. App_fini( ) is is the destructor for standard C library (e.g. glibc), which means that it releases key process and system resources that have been used by the application. Any other destructors registered at process setup will also be run at this time. These destructors will free up process resources, like memory, temporary file storage, access to device I/O, etc. The release of resources is done so that the application can terminate smoothly and return resources back to the operating system. This prevents memory and other resources from being suffocated by dead processes.

FIG. 6B shows the same process or application shown in 6A, but where the Capture Library is loaded via the LD_PRELOAD or loaded via other means previously presented. As a majority of the steps are shown shaded as they are identical in functionality and share the same numerical reference as disclosed for FIG. 6A. The following text specifically details the changes due to the Capture Library loaded during the construct of the application.

At some point before the Application Start 600 is initiated, the build system is configured at block 660 to load the Capture Library using LD_PRELOAD or another method. This configuration change could take the form of an environment variable or other system configuration. As an example in Linux would be the command, "export LD_PRELOAD=/usr/lib/library_capture.so". LD_PRELOAD instructs the Application that it should invoke the capture libraries symbols before it loads any other symbols from other libraries-including the standard C library (e.g. glibc.so).

As previously presented, the Application Starts 600 and enters the Application Construct 602 event. With the Capture Library taking precedence, the application will register Capture_Init( )) 630 as the first initialization function to take place. The application construction will continue to register the standard C function App_Init 612 and App_fini( ) 614 before proceeding to invoke initialization functions.

The Capture Library function Capture_Init( )) 632 is invoked prior to invoking the standard C library App_Init ( ) 616. Capture_Init( )) performs several steps to prepare for the automatic capturing of files. While these steps are presented in the preferred order, it should be understood that some of these steps can occur in a different order without changing the functionality.

First, using stdlib's AtExit( ) function, Capture_fini (638) is registered to be called when the process terminates. Next the Capture_Init( ) gathers detailed information relating to the current application 640. The details about the calling process are used to determine whether librssg_init should continue running or should abort. One piece of data gathered in step 640 is the current PID and the parent PID.

Next at block 642, the OS_OPEN( ) command is overloaded subordinated by the Capture_Open ( ) function 634. In Linux, this subordination is accomplished by prioritizing the Capture Library symbols by directing the library to be opened first via the LD_PRELOAD. The result is that application calls to open files 606 will be redirected to invoke Capture_Open 634, which adds extra processing before the target file descriptor assigned by the operating system's OS_Open( ) 618 is passed back to the application. This extra processing will be described below.

Lastly, the Capture_Init( ) function will open and initialize a local cache database 644 (a.k.a. Finding Map database) and record the application data 646 into the database. If the local caching database doesn't already exist on the developer build system, the database is created and initialized. Once present, the database is set to be populated with data pertaining to the current application. In addition, the local cache database will store the information identified in store gathered data 652 pertaining to the target file specified for OS_Open( ). The data for an individual file gathered in 610 is called a Finding. The local cache database (a.k.a. Finding Map) stores the findings in the form of key=path_of_the_finding, value=populated_finding. This is used for efficiency and to support stateful caching. Because all findings start with the path, it is used as the map key for each element.

Besides the local caching database, some global variables relevant to runtime security applications are initialized and set. Dependent upon the values of these variable, the application data gathered and stored by the Capture Library may be processed, tagged, or filtered and will be discussed later in block 650.

The App_Construct event 602 finishes by invoking the application constructors for the standard C library (glibc), and all other dependencies 618. As in description of FIG. 6A, the application proceeds to Application Main 604 (e.g. main.c) and begins its normal execution. Upon needing to open a file 606, the application's open file request is intercepted by the Capture_Open (file) 634 due to the overloading established at 642.

Capture_Open 634 performs three basic functions each time a file is opened by the application. In the case of a complex build this block may be repeated hundreds of times for each file or component required during the build. The first step in Capture_Open 634 is to use native operating system OS_Open( ) 648 to open the target file. Capture_Open collects the file descriptor value returned by OS_Open( ).

In some embodiments, data may be filtered or excluded based on the build environment or system conditions. As an example, if the developer is COMPILING a host tool or other utility as defined by the Yocto project, the data specific for the OS_Open( ) target file is not collected. In the context of the Yocto Project, a "host tool" refers to any tool or utility that is used on the host system (the system where you are running the Yocto build) to facilitate the process of building an embedded Linux image. These tools are necessary for compiling, assembling, and manipulating the source code and resources of the target system (the system for which the image is being built). Examples of host tools would be: "ar", "gcc", and "Id". If the file being opened is a host tool, no data is gathered at block 650 or subsequently stored to the database in block 652.

Another example of a filter where data gathering may be limited at block 650 may exist where the file opened is associated with compile-time security tools. Security tools may be identified by setting a global variable and when the target file being opened is in a temporary directory associated with that security tool (E.g. /tmp/lfr). When this condition is true, then a subset of data about the process is collected at block 650 instead of the full data described. As an example of data excluded from the complete data set, the file hash of a runtime security obfuscated file which may be invalid due to manipulated information would be removed from the data gathering 650.

As an example of using a variable for filtering based on compile-time security tools, a global Boolean variable IS_OBFUSCATED may be set to denote that the current application is affiliated with a special class of compile-time security tools. Many of these bolt-on, compile-time tools generate many files during the build process, which aren't part of the final binary's dependencies. If the application is in this class of compile-time security tools, IS_OBFUSCATED is set to true during the gather application detail 640 block and checked during the Capture_Open wrapper for special processing logic. If the application is not one of the known compile-time security tools, the value of IS_OBFUSCATED is set to "false".

The data or post-filtered data gathered in block 650 is then stored in the local cache database (a.k.a. Finding Map created in block 644) using a dictionary data structure. The file's path is the dictionary "key". The data gathered in 650 is the stored as the "value" for the "key". To eliminate redundant hash processing and thus increase efficiency, some embodiments may check the local caching database to see if a value already exists for the path and filename of the file being opened. If the key "path/filename", where path is replaced by the path of the file being opened and filename is replaced by the filename being opened, exists, then there is no further action related to the local caching database. If the key for the file being opened doesn't exist, then a new value is added to the database. The value will equal the hash of the file being opened. The key, to which the value is associated, is "path/filename", with the aforementioned replacements for "path" and "filename". At this point Capture_Open 634 is complete and the program returns to Application Main 604 and continues to the next instruction after the Open a File 606 request.

After the process has executed its intended business or hit a critical error, it will begin the process of shutting down as indicated by the block Application Destruct 608. The Capture_fini function is invoked 636, which signals that the database Finding Map should be closed 654.

In one embodiment, the database Finding Map may immediately be processed by the Capture_fini as a formatted SBOM, thus creating a complete SBOM file within the developer's build system. This approach requires the functionality of the SBOM Manager to be integrated into the Capture Library and executed during the Capture_fini.

In another embodiment, the database Finding Map is transferred to the server, instead of being kept in the memory of the developer build system. In this scenario, the findings are sent to a data repository as a series of messages over a network. If there is a finding in the Finding Map database that doesn't have a hash, then a hash is computed and sent to the data repository along with all of the other data stored for that path and filename in the Finding Map database.

After Capture_fini completes, other destructors for the process will execute—including the standard C library destructor (e.g. glibc_fini), shutting down process resources and freeing memory.

The goal of the Capture Library is to capture data about the tools required for compilation, but not the tools required for configuration of the build system. In some embodiments where the environment is identified as a yocto environment, Capture Library filters on host tools, or tools passed through chrome the system to the yocto build environment and will terminate and the process will continue unencumbered by the SBOM capture tool.

In another embodiment, filtering may be performed by the receiving server (a.k.a. Data Repository) or the SBOM Manger. As an example, if the dependency tree—as produced by the PID and parent PID mapping-doesn't start with a build tool (e.g. make, Id, gcc), the gathered data may be discarded from the final SBOM. A working example of this exists where the substitution of variables into a build script during configuration of the build system. In this instance, the initial process application would be something like 'sed' and would have no consequence on the final build outputs.

Finally, the Capture Library only needs to collect data about the source code and dependencies used by the program being compiled, excluding the dependencies associated with the build tools themselves. Dependencies of the build tools will also be accessed by the OS_Open( ) call AND MAY BE EXCLUDED FROM THE FINDINGS DATABASE.

Some data for the build may be generated via other means, such as inspection of command line arguments for the program being executed. For example, if the application is the linker (i.e. '/usr/bin/ld'), the output file may be gathered by inspecting the -o argument to the linker. Other data files may be gathered during the course of the build process.

Figure 7:
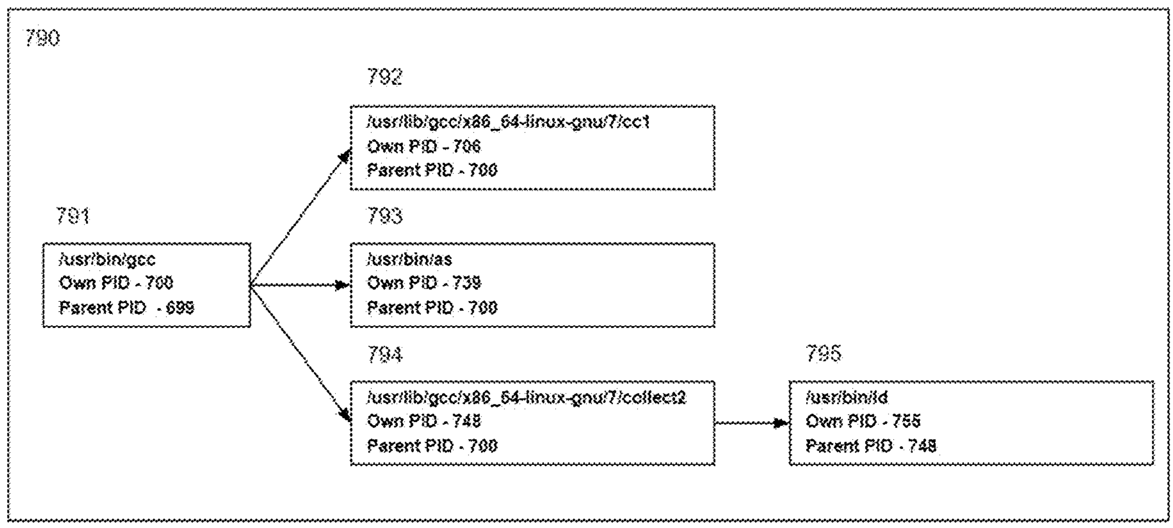
FIG. 7 shows a computer listing of the dependencies captured during a run-time build and the associated process tree.
Figure 7:
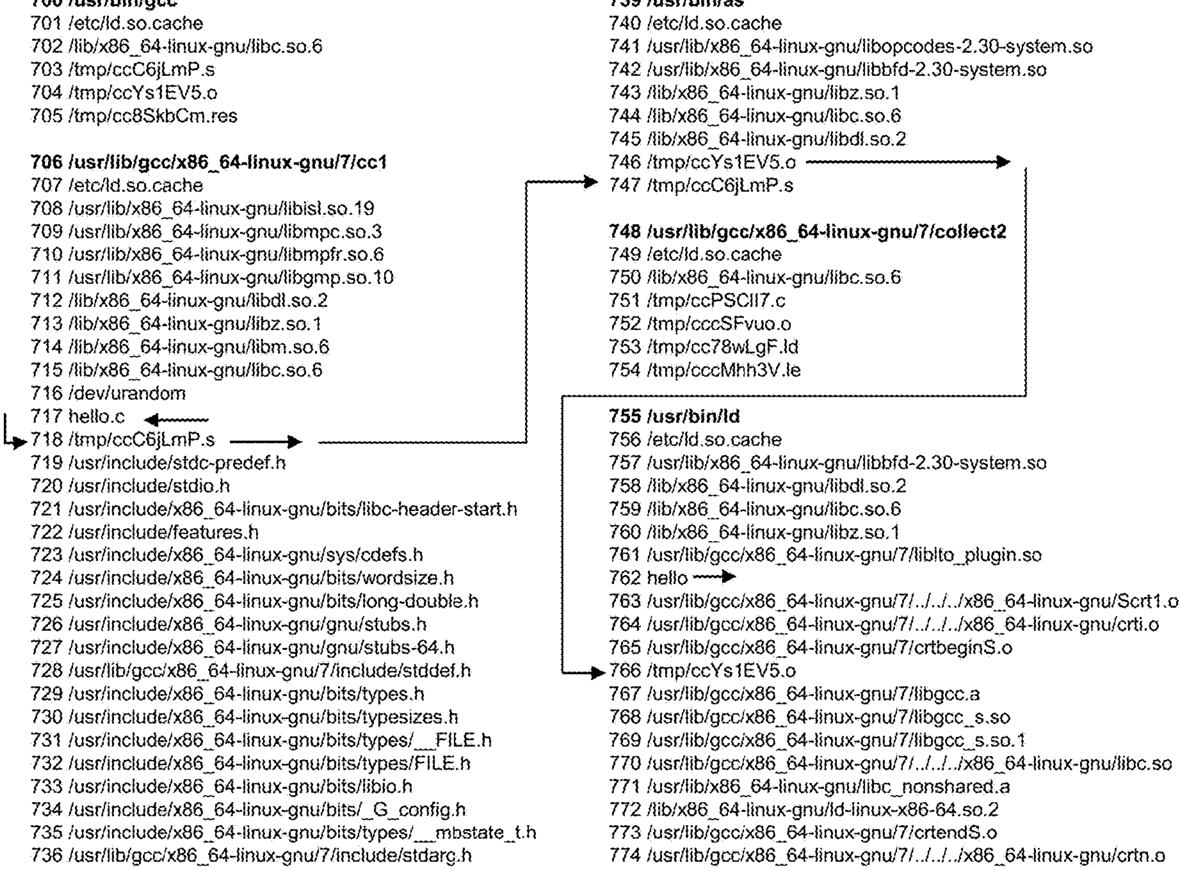

FIG. 7 shows a computer listing of the dependencies captured during a run-time build and the associated process tree illustrating by example the power and depth of the dependency data gathering utilizing method described herein. The dependency tree is established by monitoring the sequence and type of file operations conducted by different processes involved in the build, such as compilers, linkers, and assemblers. Each process, identified by its unique Process ID (PID), contributes to the creation of the final binary by operating on various files. By tracking these operations, the SBOM generator can identify direct and indirect dependencies of the final executable.

The compilation of a simple C program involves several steps where the compiler might invoke a preprocessor, assembler, and linker. Each of these tools accesses and generates specific files. By capturing the sequence of these operations and the files involved, the SBOM generator can map out a detailed dependency tree. This tree not only includes the immediate dependencies but also the transitive dependencies, providing a full picture of the software composition.

FIG. 7 is an example PID tree for compiling a simple C program, hello.c. At the top of the figure is the process ID tree 790 which shows THE interconnected relationship between the build toolchain. The compiler (./gcc) block 791 is at the root of the process tree having a process ID (PID) of 700 and shown as being called by an unseen process having a PID of 699 and representing the original compilation command executed by the user to invoke the compiler with a filename argument (i.e. ./gcc hello.c). During the build process, the compiler invokes three processes, namely the pre-processer (./cc1) block 792, the assembler (./as) block 793, and the link preprocessor (./Id) block 794. The link pre-processer subsequently invokes the linker (./Id) block 795. Each block contains the application name, the immediate or Own PID for the application, and the parent PID.

At the bottom of FIG. 7 are the files opened during the build process. Process 700 (compiler .gcc) opens files 701-705. Process 706 (pre-compiler .cc1) opens files 707-738, and so on. Having a list of all files opened is not sufficient for building a complete SBOM because one must be able to identify where components come into the final executable. For example, it is important to know that 703 is not some random file included in the build, but rather that it was created by the assembler, 739, from the source file 717. Without having a complete view of the processes that create/open files that end up in the final binary, it's impossible to know whether an object file that is used in the linking process came from an open source component, a proprietary component, or was maliciously added to the build process.

In order to compile hello.c, gcc (791) determines that it needs to invoke the c precompiler, cc1 (792). Because cc1 (792) was invoked by gcc (791), it inherits all of the environmental variables present in gcc's (791) process space. This inheritance property is a feature of the Linux operating system and is taken as given. By inheriting the LD_PRELOAD variable, librssg.so is loaded into the process space for cc1 (792). Similarly to the process for gcc (791), step 605 in the librssg_init will determine that cc1

(792) is a build tool and that data collection should continue. Additionally, it will collect the PID for cc1 (792) and its parent PID, which are 706 and 700 respectively. During cc1's execution, it will access files 707-738. Alternate embodiments on other operating systems or implementations in the kernel will result in the same process occuring, albeit by different means.

At some point during execution, gcc (791) will determine that it needs to invoke the assembler (793) and a linker pre-processor (794). The assembler and linker pre-processor continue the same pattern of environmental variable inheritance as cc1 (792). As a result, librssg.so is loaded into each process. The Own PID and Parent PID are collected for each. For the assembler (793), its PID is 739 and its Parent PID is 700). For the linker pre-processor (794), its Own PID is 748 and its Parent PID is 700. During execution, the assembler (793) accesses files 740-747. The linker pre-processor (794) access files 749-754.

The final build tool accessed is the linker (795). Amongst other things, the linker produces the final output binary, hello (762), in object code, that will be run by the developer as part of an application. By virtue of the same inheritance properties benefiting the c pre-processor (792), the assembler (793), and the linker pre-processor (794), the linker (795) will load librssg.so. It will record its own PID as 755 and its parent PID as the linker pre-processor (748). The linker (795) access files 756-774, which include the final output binary, hello (762).

Following this process tree, all files created or used during the compilation process can be tracked. For example, the source code file, hello.c (717) gets processed and eventually turned into the assembly file/tmp/ccC6jLmP.s, (718) by the c pre-processor (792). The assembly file,/tmp/ccC6jLmP.s (718) is then opened by the assembler (793) and turned into the object file/tmp/ccYs1EV5.o (746). The object file/tmp/ccYs1EV5.o (746) gets linked, by the linker (795) into the final output binary, hello (762).

Figure 8:
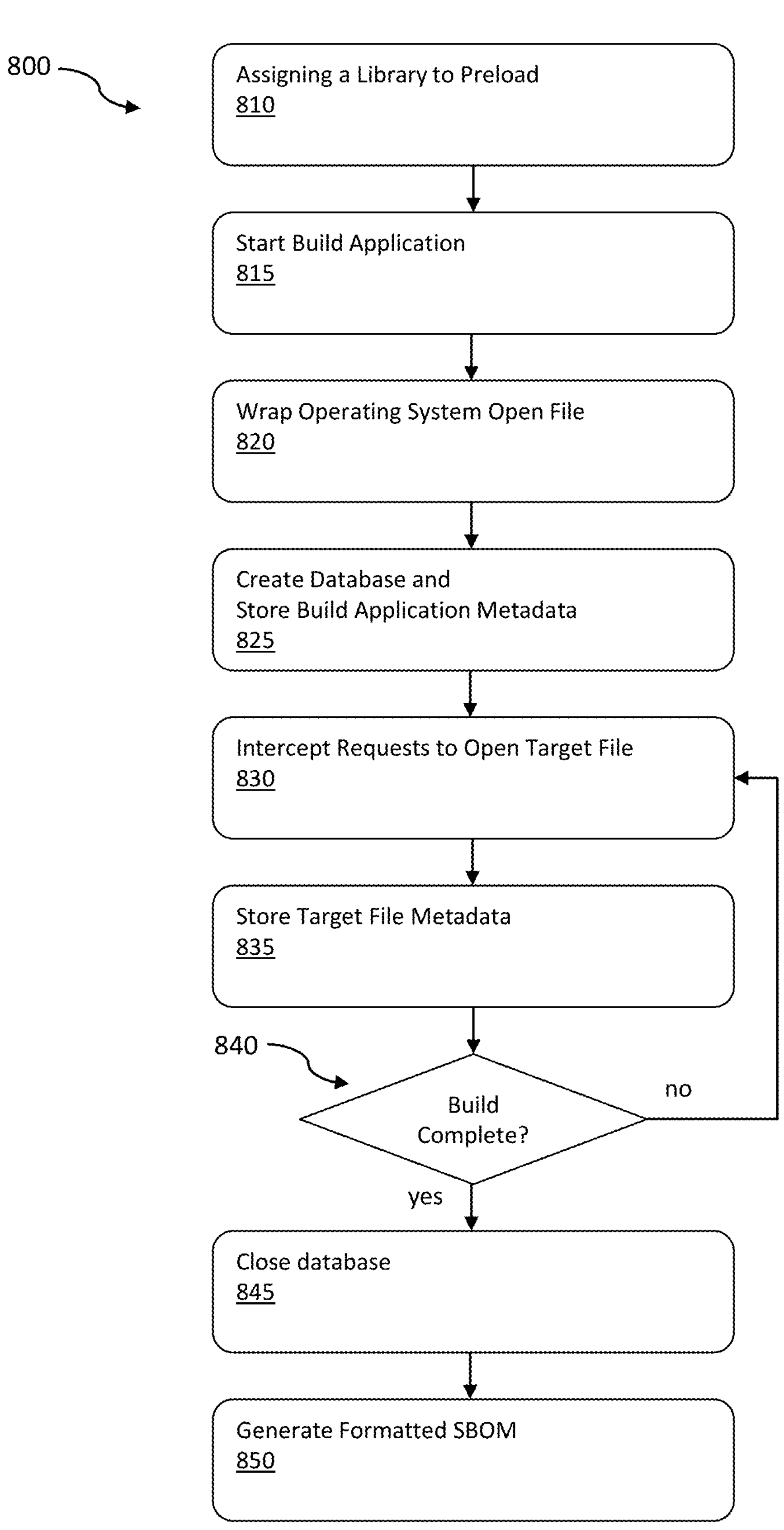
FIG. 8 shows the steps for generating a software bill-of-material.

FIG. 8 outlines steps for generating a software bill-of-material 800 during the build process for illustrating an embodiment of the inventive concept.

Assigning a Library to Preload: The system configures the build environment to preload a custom library before the build application starts 810. This library contains the necessary functions to intercept file operations and log file access information. This approach uses the LD_PRELOAD mechanism in Unix-like operating systems, or analogous techniques in other operating systems, to ensure the custom library's functions are called before any other library functions, including those of the operating system itself.

Initialize Function during Application Construction: Upon loading the build application into memory 815, the custom library's initialize function is registered and executed during the application construction phase. This function sets up the interception mechanism by wrapping the operating system's native file open function (OS_open) with the custom open-detect function 820. Additionally, it initiates a database to log file access and dependency information; information regarding the build application may be captured here 825.

Open-Detect Function for File Access: When the build application attempts to open a file (e.g. target file) as part of its normal operation (application objective), the open-detect function intercepts this call 830. It collects information about the file being accessed, including unique identifiers and dependency information, and logs this data into the previously created database 835. After logging the necessary information, the open-detect function calls the original OS_open function to proceed with the file operation, seamlessly integrating with the build process. The build process is assessed 840: if the build process is complete, the build process continues to block 845 otherwise; if the build process is not complete, the build process returns to intercept additional open file calls 830.

Exit Function during Application Deconstruction: As the build process concludes and the application deconstruction phase begins, the custom library's exit function is invoked. This function is responsible for closing the database containing all logged file access information 845.

Generating the SBOM: With the database now complete with details of all files accessed during the build and their dependencies, the system generates the SBOM 850. This SBOM includes unique identifiers for each file involved in the build process, effectively fulfilling the claim's criteria.

Alternative Operating Systems

The SBOM (Software Bill of Materials) capture function represents a versatile mechanism that can significantly enhance transparency and traceability across diverse build environments and toolchains. One illustrative example of its application is within a traditional C/C++ development environment, where the function could intercept file operations during the compilation and linking phases managed by tools such as GCC or Clang. By wrapping system calls to open source files, header files, and libraries, the SBOM capture function can automatically document the use of third-party libraries, including version information and dependencies, thus facilitating compliance and security audits.

In a Java build environment utilizing Apache Maven or Gradle, the SBOM capture function could be integrated to monitor the resolution and usage of Maven dependencies or Gradle artifacts. As these tools fetch dependencies from repositories, the function can capture the artifact identifiers and their versions, thereby creating a comprehensive list of dependencies that are actually used during the build, which is invaluable for managing open-source license compliance and vulnerability tracking.

For web development projects that rely on JavaScript and Node.js, integrating the SBOM capture function with npm or yarn package managers could offer insights into the npm packages and their dependencies. By wrapping the package installation and build process, the function can generate an SBOM that includes not only direct dependencies but also transitive dependencies, offering a deep dive into the dependency tree which is crucial for securing web applications against the exploitation of vulnerabilities in nested dependencies.

In the context of containerized applications, particularly those built using Docker, the SBOM capture function can be applied to track the base images, packages, and libraries included in each layer of a Docker image. This application scenario involves wrapping Docker build commands to capture the contents and dependencies as each layer is created, providing an SBOM that gives visibility into everything that goes into a container, from the operating system packages to the application-specific libraries.

Lastly, for embedded systems development that often involves cross-compilation toolchains like those provided by Yocto or Buildroot, the SBOM capture function could be used to track the inclusion of software components across the toolchain and application code. This is particularly challenging due to the complexity and variability of embedded software stacks, but by capturing information on the libraries, binaries, and modules as they are compiled and linked for the target architecture, developers can ensure compliance with licensing requirements and manage security vulnerabilities effectively.

These examples underscore the adaptability of the SBOM capture function across various software development environments, making it a powerful tool for enhancing software supply chain security and compliance by automatically generating accurate and comprehensive SBOMs.

The invention claimed is:

1. A method for generating a software bill-of-material on a developers build system during the build process of a binary file, the software bill-of-material including unique identifiers for all files accessed during the build process and their dependencies, the method comprising:

- assigning a library to preload as part of the build process when a build application is loaded into memory on the developers build system, said library comprising an initialize function, an exit function, and an open-detect function,
- said build application comprising a series of code blocks which are executed as sequential events including an application construction, an application objective, and an application deconstruction, and
- said developers build system having an operating system which includes an open-file function;
- registering the initialize function to be executed during the application construction,
- the exit function to be executed during the application deconstruction,
- invoking the initialize function during the application construction, thereby causing the open-detect function to wrap the open-file function of the operating systems such that the open-detect function is executed with any subsequent open-file call performed on the developers build system, and creating a database and storing metadata relating to the build application;
- exiting the application construction code block and proceeding to the application objective, wherein the application objective includes code to open a file;
- calling the operating system's open-file function to open said file;
- intercepting the open-file function call by the open-detect function, said open-detect function collecting information relative to the file, and storing said information to the database, and invoking the operating system's open-file function prior to returning to the application objective;
- completing the application objective and entering the application deconstruction wherein the application deconstruction invokes the exit function, said exit function closing said database;
- generating a software bill-of-material from the stored information from the database.

2. The method of claim 1, wherein assigning the library to preload comprises configuring the developers build system, prior to loading the build application into memory, to cause the operating system to load the library into a process space of the build application before any other library is loaded, such that symbols of the library, including the open-detect function, are resolved by the build application in preference to corresponding symbols of any other library.

3. The method of claim 1, wherein the information collected by the open-detect function comprises one or more of file type, author, publisher, name, version, hash, licenses, copyright, and process identifier (PID), and wherein the database comprises a dictionary data structure in which a path and filename of an accessed file serves as a key and the collected information serves as a value associated with the key.

4. The method of claim 1, further comprising, prior to computing a hash of a file being opened, checking the database to determine whether an entry corresponding to the path and filename of the file already exists, and, if the entry exists, omitting recomputation of the hash for that file.

5. The method of claim 1, further comprising collecting a process identifier (PID) and a parent process identifier (parent PID) for the build application, and mapping a dependency tree between files based at least in part on the PID and parent PID, wherein the build application invokes one or more child processes including at least one of a preprocessor, an assembler, a link preprocessor, and a linker, and wherein the library is inherited by each child process via environment variable inheritance such that the open-detect function intercepts open-file calls performed by each child process.

6. The method of claim 1, further comprising filtering the information collected by the open-detect function based on at least one of: whether a target file being opened is associated with a host tool of a build environment, such that information for host tools is excluded from the database; and a global variable indicating that the build application is associated with a compile-time security tool, such that a subset of data is collected when the global variable is set.

7. The method of claim 1, further comprising inspecting one or more command-line arguments passed to the build application when the build application is invoked, deriving additional information about the build process from said one or more command-line arguments, and storing the additional information in the database in association with the metadata relating to the build application.

8. A system for generating a software bill-of-material on a developers build system during the build process of a binary file, the software bill-of-material including unique identifiers for all files accessed during the build process and their dependencies, the system comprising:

- the developers build system having an operating system which includes an open-file function;
- a build application loaded into memory on the developers build system, said build application comprising a series of code blocks which are executed as sequential events including an application construction, an application objective, and an application deconstruction; and
- a library assigned to be preloaded as part of the build process when the build application is loaded into memory on the developers build system, said library comprising an initialize function, an exit function, and an open-detect function, wherein the initialize function is registered to be executed during the application construction and the exit function is registered to be executed during the application deconstruction;
- wherein the initialize function, when invoked during the application construction, is configured to cause the open-detect function to wrap the open-file function of the operating system such that the open-detect function is executed with any subsequent open-file call performed on the developers build system, and to create a database and store metadata relating to the build application;
- wherein, upon exiting the application construction code block and proceeding to the application objective, the application objective includes code to open a file and calls the operating system's open-file function to open said file;

wherein the open-detect function is configured to intercept the open-file function call, to collect information relative to the file, to store said information to the database, and to invoke the operating system's open-file function prior to returning to the application objective;

wherein, upon completing the application objective and entering the application deconstruction, the application deconstruction invokes the exit function, said exit function closing said database; and wherein a software bill-of-material is generated from the stored information from the database.

9. The system of claim 8, wherein the developers build system is configured, prior to loading the build application into memory, to cause the operating system to load the library into a process space of the build application before any other library is loaded, such that symbols of the library, including the open-detect function, are resolved by the build application in preference to corresponding symbols of any other library.

10. The system of claim 8, wherein the information collected by the open-detect function comprises one or more of file type, author, publisher, name, version, hash, licenses, copyright, and process identifier (PID), and wherein the database comprises a dictionary data structure in which a path and filename of an accessed file serves as a key and the collected information serves as a value associated with the key.

11. The system of claim 8, wherein the open-detect function is further configured, prior to computing a hash of a file being opened, to check the database to determine whether an entry corresponding to the path and filename of the file already exists, and, if the entry exists, to omit recomputation of the hash for that file.

12. The system of claim 8, wherein the open-detect function is further configured to collect a process identifier (PID) and a parent process identifier (parent PID) for the build application, and to map a dependency tree between files based at least in part on the PID and parent PID, wherein the build application invokes one or more child processes including at least one of a preprocessor, an assembler, a link preprocessor, and a linker, and wherein the library is inherited by each child process via environment variable inheritance such that the open-detect function intercepts open-file calls performed by each child process.

13. The system of claim 8, wherein the open-detect function is further configured to filter the information collected based on at least one of: whether a target file being opened is associated with a host tool of a build environment, such that information for host tools is excluded from the database; and a global variable indicating that the build application is associated with a compile-time security tool, such that a subset of data is collected when the global variable is set.

14. The system of claim 8, wherein the library is further configured to inspect one or more command-line arguments passed to the build application when the build application is invoked, to derive additional information about the build process from said one or more command-line arguments, and to store the additional information in the database in association with the metadata relating to the build application.

15. A non-transitory computer-readable medium storing instructions for generating a software bill-of-material on a developers build system during the build process of a binary file, the software bill-of-material including unique identifiers for all files accessed during the build process and their dependencies, the instructions, when executed by one or more processors of the developers build system, cause the processor to:

assign a library to preload as part of the build process when a build application is loaded into memory on the developers build system, said library comprising an initialize function, an exit function, and an open-detect function, said build application comprising a series of code blocks which are executed as sequential events including an application construction, an application objective, and an application deconstruction, and said developers build system having an operating system which includes an open-file function;

register the initialize function to be executed during the application construction, the exit function to be executed during the application deconstruction;

invoke the initialize function during the application construction, thereby causing the open-detect function to wrap the open-file function of the operating system such that the open-detect function is executed with any subsequent open-file call performed on the developers build system, and create a database and store metadata relating to the build application;

exit the application construction code block and proceed to the application objective, wherein the application objective includes code to open a file;

call the operating system's open-file function to open said file;

intercept the open-file function call by the open-detect function, said open-detect function collecting information relative to the file, and store said information to the database, and invoke the operating system's open-file function prior to returning to the application objective;

complete the application objective and enter the application deconstruction wherein the application deconstruction invokes the exit function, said exit function closing said database; and generate a software bill-of-material from the stored information from the database.

16. The non-transitory computer-readable medium of claim 15, wherein assigning the library to preload comprises configuring the developers build system, prior to loading the build application into memory, to cause the operating system to load the library into a process space of the build application before any other library is loaded, such that symbols of the library, including the open-detect function, are resolved by the build application in preference to corresponding symbols of any other library.

17. The non-transitory computer-readable medium of claim 15, wherein the instructions further cause the processor to: prior to computing a hash of a file being opened, check the database to determine whether an entry corresponding to the path and filename of the file already exists, and, if the entry exists, omit recomputation of the hash for that file.

18. The non-transitory computer-readable medium of claim 15, wherein the instructions further cause the processor to: collect a process identifier (PID) and a parent process identifier (parent PID) for the build application and map a dependency tree between files based at least in part on the PID and parent PID, wherein the build application invokes one or more child processes including at least one of a preprocessor, an assembler, a link preprocessor, and a linker, and wherein the library is inherited by each child process via environment variable inheritance such that the open-detect function intercepts open-file calls performed by each child process.

19. The non-transitory computer-readable medium of claim 15, wherein the instructions further cause the processor to: filter the information collected by the open-detect function based on at least one of: whether a target file being opened is associated with a host tool of a build environment, such that information for host tools is excluded from the database; and a global variable indicating that the build application is associated with a compile-time security tool, such that a subset of data is collected when the global variable is set.

20. The non-transitory computer-readable medium of claim 15, wherein the instructions further cause the processor to: inspect one or more command-line arguments passed to the build application when the build application is invoked, derive additional information about the build process from said one or more command-line arguments, and store the additional information in the database in association with the metadata relating to the build application.

* * * * *